United States Patent
Kong et al.

(10) Patent No.: US 12,548,605 B2
(45) Date of Patent: Feb. 10, 2026

(54) INTERFACE CIRCUIT AND SEMICONDUCTOR DEVICE INCLUDING THE SAME

(71) Applicant: SK hynix Inc., Gyeonggi-do (KR)

(72) Inventors: In Seok Kong, Gyeonggi-do (KR); Gwan Woo Kim, Gyeonggi-do (KR); Keun Seon Ahn, Gyeonggi-do (KR); Eun Ho Yang, Gyeonggi-do (KR); Sung Hwa Ok, Gyeonggi-do (KR); Eun Ji Choi, Gyeonggi-do (KR); Jun Ho Hong, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 126 days.

(21) Appl. No.: 18/408,571

(22) Filed: Jan. 10, 2024

(65) Prior Publication Data
US 2025/0078879 A1 Mar. 6, 2025

(30) Foreign Application Priority Data
Sep. 1, 2023 (KR) .......................... 10-2023-0116185

(51) Int. Cl.
*G11C 7/10* (2006.01)
(52) U.S. Cl.
CPC .................................. *G11C 7/1048* (2013.01)

(58) Field of Classification Search
CPC ..................................................... G11C 7/1048
USPC ..................................................... 365/189.18
See application file for complete search history.

(56) References Cited

U.S. PATENT DOCUMENTS

2012/0243345 A1* 9/2012 Matsuoka ............ G11C 7/1057
 365/189.011
2014/0015590 A1 1/2014 Yoon et al.
2021/0118476 A1* 4/2021 Kojima ................. G11C 7/103
2024/0097658 A1* 3/2024 Watanabe ............ G11C 7/1048

FOREIGN PATENT DOCUMENTS

KR 10-2019-0135863 A 12/2019

* cited by examiner

*Primary Examiner* — Anthan Tran
(74) *Attorney, Agent, or Firm* — IP & T GROUP LLP

(57) ABSTRACT

Disclosed is an interface circuit and a semiconductor device including the same. The interface circuit may include a data pad, a first driving circuit connected between the data pad and a first supply node, and configured to adjust a first resistance value applied between the data pad and the first supply node according to termination modes and selectively drive the data pad with a first supply voltage, and a first tuning circuit connected between the first supply node and a first voltage supply terminal, and configured to tune the first resistance value according to the termination modes.

20 Claims, 6 Drawing Sheets

INTERFACE CIRCUIT AND SEMICONDUCTOR DEVICE INCLUDING THE SAME

CROSS-REFERENCE TO RELATED APPLICATION(S)

This application claims priority under 35 U.S.C. § 119 to Korean Patent Application No. 10-2023-0116185, filed on Sep. 1, 2023, the disclosure of which is incorporated herein by reference in its entirety.

BACKGROUND

1. Field

Various embodiments of the present disclosure relate to a semiconductor design technique, and more particularly, to an interface circuit and a semiconductor device including the same.

2. Description of the Related Art

To transmit signals between semiconductor devices, each of the semiconductor devices includes an interface circuit. The signal transmitted through the interface circuit may be reflected at an end terminal of a transmission line. The reflected signal, which is a noise component, may degrade the quality of the signal (i.e., signal integrity).

The interface circuit supports a termination mode in which a termination resistor is connected to the end terminal of the transmission line, to prevent the signal from being reflected. The end terminal of the transmission line may be terminated at a constant voltage level by the termination resistor. The termination mode may be a center tap termination (CTT) mode, a low tap termination (LTT) mode, or the like, depending on a target voltage level of the end terminal.

Recently, an interface circuit that supports a plurality of termination modes, for example, the CTT mode and the LTT mode, has been developed.

SUMMARY

Various embodiments of the present disclosure are directed to an interface circuit having optimized performance in a plurality of termination modes, and a semiconductor device including the interface circuit.

In accordance with an embodiment of the present disclosure, an interface circuit may include: a data pad; a first driving circuit connected between the data pad and a first supply node, and configured to adjust a first resistance value applied between the data pad and the first supply node according to termination modes and selectively drive the data pad with a first supply voltage; and a first tuning circuit connected between the first supply node and a first voltage supply terminal, and configured to tune the first resistance value according to the termination modes.

In accordance with an embodiment of the present disclosure, an interface circuit may include: a data pad; an output circuit connected to the data pad, and configured to adjust a pull-up resistance value and a pull-down resistance value applied to the data pad according to termination modes, and output, through the data pad, output data which corresponds to a selected mode among the termination modes; and a tuning circuit connected to the output circuit, and configured to tune the pull-up resistance value and the pull-down resistance value according to the termination modes.

In accordance with an embodiment of the present disclosure, a semiconductor device may include: a control circuit configured to generate first to third pull-up control signals and first to third pull-down control signals, which correspond to termination modes and a power-down mode, based on data, first and second mode signals, a plurality of first and second trimming code signals, and a power gating signal; and an interface circuit configured to: adjust a pull-up resistance value and a pull-down resistance value applied to a data pad according to the termination modes based on the first and second pull-up control signals and the first and second pull-down control signals; selectively tune the pull-up resistance value and the pull-down resistance value according to a selected mode among the termination modes based on the third pull-up control signals and the plurality of third pull-down control signals; and interface output data corresponding to the data.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements but may further include or have the one or more other elements, unless otherwise mentioned. In the description throughout the specification, some components are described in singular forms, but the present disclosure is not limited thereto, and it will be understood that the components may be formed in plural.

Figure 1:
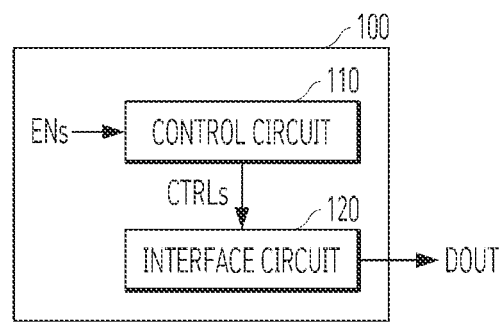
FIG. 1 is a block diagram illustrating a semiconductor device in accordance with an embodiment of the present disclosure.

FIG. 1 is a block diagram illustrating a semiconductor device 100 in accordance with an embodiment of the present disclosure.

Referring to FIG. 1, the semiconductor device 100 may include a control circuit 110 and an interface circuit 120.

The control circuit 110 may generate a plurality of output control signals CTRLs on the basis of a plurality of input control signals ENs. The plurality of input control signals ENs may include data DIN, first and second mode signals CTT_EN and LTT_EN, a plurality of first trimming code signals PU_TRIM<1:N>, a plurality of second trimming code signals PD_TRIM<1:N>, where "N" is a natural number, and a power gating signal PG_EN, which are not illustrated in FIG. 1 and will be described later. The plurality of output control signals CTRLs may include a first pull-up control signal PUEN, a plurality of second pull-up control signals PU_TR<1:N>, a plurality of third pull-up control signals PGB<1:3>, a first pull-down control signal PDEN, a plurality of second pull-down control signals PD_TR<1:N>, and a plurality of third pull-down control signals PG<1:3>, which are not illustrated in FIG. 1 and will be described later.

The interface circuit 120 may output (or interface) output data DOUT which corresponds to the data DIN to an external device, for example, an external controller, etc., on the basis of the plurality of output control signals CTRLs. The interface circuit 120 may adjust a pull-up resistance value and a pull-down resistance value related to the output data DOUT according to first and second termination modes on the basis of the first pull-up control signal PUEN and the plurality of second pull-up control signals PU_TR<1:N>. The interface circuit 120 may tune the pull-up resistance value and the pull-down resistance value on the basis of the plurality of third pull-up control signals PGB<1:3> and the plurality of third pull-down control signals PG<1:3>. For example, during the first termination mode, the interface circuit 120 may not tune the pull-up resistance value and the pull-down resistance value, and during the second termination mode, the interface circuit 120 may tune the pull-up resistance value and the pull-down resistance value. The first termination mode may include a center tap termination (CTT) mode, and the second termination mode may include a low tap termination (LTT) mode.

Figure 2:
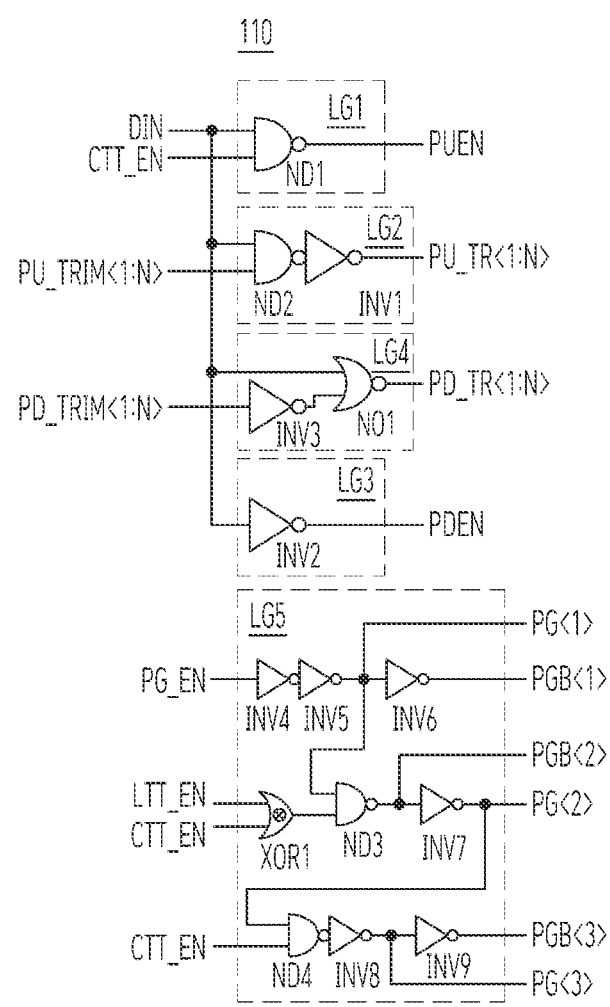
FIG. 2 is a circuit diagram illustrating a detailed configuration of a control circuit illustrated in FIG. 1 in accordance with an embodiment of the present disclosure.

FIG. 2 is a circuit diagram illustrating a detailed configuration of the control circuit 110 illustrated in FIG. 1 in accordance with an embodiment of the present disclosure.

Referring to FIG. 2, the control circuit 110 may include first to fifth control logic circuits LG1, LG2, LG3, LG4, and LG5.

The first control logic circuit LG1 may generate the first pull-up control signal PUEN on the basis of the data DIN and the first mode signal CTT_EN. For example, the first control logic circuit LG1 may include a NAND gate ND1. The NAND gate ND1 may generate the first pull-up control signal PUEN by performing a NAND operation on the data DIN and the first mode signal CTT_EN.

The second control logic circuit LG2 may generate the plurality of second pull-up control signals PU_TR<1:N> on the basis of the data DIN and the plurality of first trimming code signals PU_TRIM<1:N>. For example, the second control logic circuit LG2 may include a NAND gate ND2 and an inverter INV1. The NAND gate ND2 may perform a NAND operation on the data DIN and a corresponding bit of the plurality of first trimming code signals PU_TRIM<1:N>, and the inverter INV1 may invert a corresponding bit of output signals of the NAND gate ND2 to generate a corresponding bit of the plurality of second pull-up control signals PU_TR<1:N>. Although FIG. 2 illustrates that only one unit circuit is representatively included in the second control logic circuit LG2, in actuality, the second control logic circuit LG2 may include N unit circuits corresponding to the number of bits of the plurality of first trimming code signals PU_TRIM<1:N>.

The third control logic circuit LG3 may generate the first pull-down control signal PDEN on the basis of the data DIN. For example, the third control logic circuit LG3 may include an inverter INV2. The inverter INV2 may invert the data DIN to generate the first pull-down control signal PDEN.

The fourth control logic circuit LG4 may generate the plurality of second pull-down control signals PD_TR<1:N> on the basis of the data DIN and the plurality of second trimming code signals PD_TRIM<1:N>. For example, the fourth control logic circuit LG4 may include an inverter INV3 and a NOR gate NO1. The inverter INV3 may invert a corresponding bit of the plurality of second trimming code signals PD_TRIM<1:N>, and the NOR gate NO1 may perform a NOR operation on the data DIN and a corresponding bit of output signals of the inverter INV3 to generate the plurality of second pull-down control signals PD_TR<1:N>. Although FIG. 2 illustrates that only one unit circuit is representatively included in the fourth control logic circuit LG4, in actuality, the fourth control logic circuit LG4 may include N unit circuits corresponding to the number of bits of the plurality of second trimming code signals PD_TRIM<1:N>.

The fifth control logic circuit LG5 may generate the plurality of third pull-up control signals PGB<1:3> and the plurality of third pull-down control signal PG<1:3> on the basis of the first and second mode signals CTT_EN and LTT_EN and the power gating signal PG_EN. For example, the fifth control logic circuit LG5 may include a first circuit INV4, INV5, and INV6, a second circuit XOR1, ND3, and INV7, and a third circuit ND4, INV8, and INV9.

The first circuit INV4, INV5, and INV6 may include three inverters INV4, INV5, and INV6. The inverter INV4 may invert the power gating signal PG_EN, the inverter INV5 may invert an output signal of the inverter INV4 to generate the first pull-down signal PG<1> of the plurality of third pull-down control signals PG<1:3>, and the inverter INV6 may invert the first pull-down signal PG<1> to generate the first pull-up signal PGB<1> of the plurality of third pull-up control signals PGB<1:3>.

The second circuit XOR1, ND3, and INV7 may include an exclusive OR gate XOR1, a NAND gate ND3, and an inverter INV7. The exclusive OR gate XOR1 may perform an exclusive OR operation on the first and second mode signals CTT_EN and LTT_EN, the NAND gate ND3 may perform a NAND operation on the first pull-down signal PG<1> and an output signal of the exclusive OR gate XOR1 to generate the second pull-up signal PGB<2> of the plurality of third pull-up control signals PGB<1:3>, and the inverter INV7 may inverter the second pull-up signal PGB<2> to generate the second pull-down signal PG<2> of the plurality of third pull-down control signals PG<1:3>.

The third circuit ND4, INV8, and INV9 may include a NAND gate ND4 and two inverters INV8 and INV9. The NAND gate ND4 may perform a NAND operation on the second pull-down signal PG<2> and the first mode signal CTT_EN, the inverter INV8 may invert an output signal of the NAND gate ND4 to generate the third pull-down signal PG<3> of the plurality of third pull-down control signals PG<1:3>, and the inverter INV9 may invert the third pull-down signal PG<3> to generate the third pull-up signal PGB<3> of the third pull-up control signals PGB<1:3>.

Figure 3:
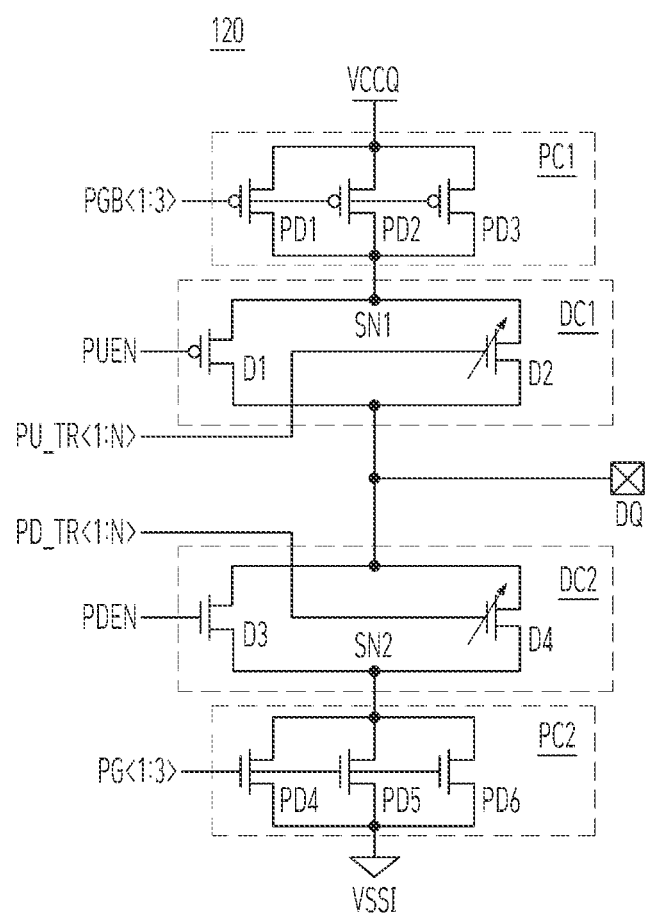
FIG. 3 is a circuit diagram illustrating a detailed configuration of an interface circuit illustrated in FIG. 1 in accordance with an embodiment of the present disclosure.

FIG. 3 is a circuit diagram illustrating a detailed configuration of the interface circuit 120 illustrated in FIG. 1 in accordance with an embodiment of the present disclosure.

Referring to FIG. 3, the interface circuit 120 may include a data pad DQ, output circuits DC1 and DC2, and tuning circuits PC1 and PC2.

The data pad DQ may output the output data DOUT to the external device.

The output circuits DC1 and DC2 may be connected to the data pad DQ. The output circuits DC1 and DC2 may output the output data DOUT corresponding to a selected mode among the first and second termination modes through the data pad DQ. For example, the output circuits DC1 and DC2 may include a pull-up driving circuit DC1 and a pull-down driving circuit DC2.

The pull-up driving circuit DC1 may be connected between the data pad DQ and a first supply node SN1. The pull-up driving circuit DC1 may adjust the pull-up resistance value, and pull-up drive the data pad DQ, according to the selected mode among the first and second termination modes.

The pull-up driving circuit DC1 may include a first pull-up driver D1 and a plurality of second pull-up drivers D2. The first pull-up driver D1 may be independently controlled in a predetermined mode of the first and second termination modes, on the basis of the first pull-up control signal PUEN. For example, the first pull-up driver D1 may be independently controlled in the first termination mode, that is, the CTT mode. The plurality of second pull-up drivers D2 may be controlled in common in the first and second termination modes, on the basis of the plurality of second pull-up control signals PU_TR<1:N>.

The pull-down driving circuit DC2 may be connected between the data pad DQ and a second supply node SN2. The pull-down driving circuit DC2 may adjust the pull-down resistance value, and pull-down drive the data pad DQ, according to the selected mode.

The pull-down driving circuit DC2 may include a first pull-down driver D3 and a plurality of second pull-down drivers D4. The first pull-down driver D3 may be independently controlled in a predetermined mode of the first and second termination modes, on the basis of the first pull-down control signal PDEN. For example, the first pull-down driver D3 may be independently controlled in the first termination mode, that is, the CTT mode. The plurality of second pull-down drivers D4 may be controlled in common in the first and second termination modes, on the basis of the plurality of second pull-down control signals PD_TR<1:N>.

The tuning circuits PC1 and PC2 may be connected to the output circuits DC1 and DC2, respectively. The tuning circuits PC1 and PC2 may tune the pull-up resistance value and the pull-down resistance value according to the first and second termination modes. The tuning circuits PC1 and PC2 may further adjust the pull-up resistance value and the pull-down resistance value according to the first and second termination modes. The tuning circuits PC1 and PC2 may be indirectly connected to the data pad DQ through the output circuits DC1 and DC2, respectively. The tuning circuits PC1 and PC2 may tune the pull-up resistance value and the pull-down resistance value without being directly connected to the data pad DQ. For example, the tuning circuits PC1 and PC2 may include a pull-up tuning circuit PC1 and a pull-down tuning circuit PC2.

The pull-up tuning circuit PC1 may be connected between a high voltage supply terminal VCCQ and the first supply node SN1. The pull-up tuning circuit PC1 may tune the pull-up resistance value according to the first and second termination modes, on the basis of the first to third pull-up signals PGB<1:3>. The pull-up tuning circuit PC1 may include third pull-up drivers PD1, PD2, and PD3 connected in parallel between the high voltage supply terminal VCCQ and the first supply node SN1. The third pull-up drivers PD1, PD2, and PD3 may selectively operate according to the first and second termination modes, on the basis of the first to third pull-up signals PGB<1:3>, respectively. The pull-up tuning circuit PC1 may electrically disconnect the high voltage supply terminal VCCQ from the first supply node SN1 during a power-down mode.

The pull-down tuning circuit PC2 may be connected between the second supply node SN2 and a low voltage supply terminal VSSI. The pull-down tuning circuit PC2 may tune the pull-down resistance value according to the first and second termination modes. The pull-down tuning circuit PC2 may include third pull-down drivers PD4, PD5, and PD6 connected in parallel between the second supply node SN2 and the low voltage supply terminal VSSI. The third pull-down drivers PD4, PD5, and PD6 may selectively operate according to the first and second termination modes, on the basis of the first to third pull-down signals PG<1:3>, respectively. The pull-down tuning circuit PC2 may electrically disconnect the second supply node SN2 from the low voltage supply terminal VSSI during the power-down mode.

Hereinafter, an operation of the semiconductor device 100 in accordance with an embodiment of the present disclosure, which has the above-described configuration, is described with reference to FIGS. 4 and 5.

The power gating signal PG_EN and the first and second mode signals CTT_EN and LTT_EN may be controlled as shown in Table 1 below. In Table 1, "X" may refer to a "don't care" condition. For reference, logic levels of the first to third pull-up signals PGB<1:3> are not indicated in Table 1, but the first to third pull-up signals PGB<1:3> may correspond to inverted signals of the first to third pull-down signals PG<1:3> (refer to FIG. 2).

TABLE 1

| MODE | PG_EN | CTT_EN | LTT_EN | PG<1> | PG<1> | PG<3> |
|---|---|---|---|---|---|---|
| POWER-DOWN MODE | 0 | X | X | 0 | 0 | 0 |
| 1$^{ST}$ TERMINATION MODE | 1 | 1 | 0 | 1 | 1 | 1 |
| 2$^{ND}$ TERMINATION MODE | 1 | 0 | 1 | 1 | 1 | 0 |

During the power-down mode, the power gating signal PG_EN may be activated. For example, the power gating signal PG_EN may have a low logic level, i.e., "0". Accordingly, the first to third pull-up signals PGB<1:3> and the first to third pull-down signals PG<1:3> may be deactivated regardless of logic levels of the first and second mode signals CTT_EN and LTT_EN. For example, the first to third pull-up signals PGB<1:3> may all have a high logic level, i.e., "1", and the first to third pull-down signals PG<1:3> may all have the low logic level, i.e., "0".

During the power-down mode, the pull-up tuning circuit PC1 may electrically disconnect the high voltage supply terminal VCCQ from the first supply node SN1 on the basis of the deactivated first to third pull-up signals PGB<1:3>, and the pull-down tuning circuit PC2 may electrically disconnect the second supply node SN2 from the low voltage supply terminal VSSI.

During the first termination mode, that is, the CTT mode, and the second termination mode, that is, the LTT mode, the power gating signal PG_EN may be deactivated. For example, the power gating signal PG_EN may have the high logic level, i.e., "1".

During the first termination mode, the first mode signal CTT_EN may be activated, and the second mode signal LTT_EN may be deactivated. For example, the first mode signal CTT_EN may have the high logic level, i.e., "1", and the second mode signal LTT_EN may have the low logic level, i.e., "0". Accordingly, all of the first to third pull-up signals PGB<1:3> and all of the first to third pull-down signals PG<1:3> may be activated. For example, the first to third pull-up signals PGB<1:3> may all have the low logic level, i.e., "0", and the first to third pull-down signals PG<1:3> may all have the high logic level, i.e., "1". Although it is described as an example in the present embodiment that in the first termination mode, all of the first to third pull-up signals PGB<1:3> and all of the first to third pull-down signals PG<1:3> are activated, it is not necessarily limited to this, and depending on design, some of the first to third pull-up signals PGB<1:3> and some of the first to third pull-down signals PG<1:3> may be activated.

During the first termination mode, the pull-up driving circuit DC1 may adjust the pull-up resistance value applied to the data pad DQ. In this case, the pull-up tuning circuit PC1 might not tune the pull-up resistance value. During the first termination mode, the pull-up tuning circuit PC1 may reflect only a predetermined default value in the pull-up resistance value.

During the first termination mode, the pull-down driving circuit DC2 may adjust the pull-down resistance value applied to the data pad DQ. In this case, the pull-down tuning circuit PC2 may not tune the pull-down resistance value. During the first termination mode, the pull-down tuning circuit PC2 may reflect only a predetermined default value in the pull-down resistance value.

During the second termination mode, the first mode signal CTT_EN may be deactivated, and the second mode signal LTT_EN may be activated. For example, the first mode signal CTT_EN may have the low logic level, i.e., "0", and the second mode signal LTT_EN may have the high logic level, i.e., "1". Accordingly, the first to third pull-up signals PGB<1:3> and the first to third pull-down signals PG<1:3> may be selectively activated. For example, the first pull-up signal PGB<1> may have the low logic level, i.e., "0", the second pull-up signal PGB<2> may have the low logic level, i.e., "0", the third pull-up signal PGB<3> may have the high logic level, i.e., "1", the first pull-down signal PG<1> may have the high logic level, i.e., "1", the second pull-down signal PG<2> may have the high logic level, i.e., "1", and the third pull-down signal PG<3> may have the low logic level, i.e., "0". Although it is described as an example in the present embodiment that in the second termination mode, the first and second pull-up signals PGB<1:2> among the first to third pull-up signals PGB<1:3> are activated and the first and second pull-down signals PG<1:2> among the first to third pull-down signals PG<1:3> are activated, it is not necessarily limited to this, and depending on design, at least one of the first to third pull-up signals PGB<1:3> and at least one of the first to third pull-down signals PG<1:3> may be activated.

During the second termination mode, the pull-up driving circuit DC1 may adjust the pull-up resistance value applied to the data pad DQ. In this case, the pull-up tuning circuit PC1 may tune the pull-up resistance value. During the second termination mode, the pull-up tuning circuit PC1 may reflect an additional resistance value different from the default value in the pull-up resistance value.

During the second termination mode, the pull-down driving circuit DC2 may adjust the pull-down resistance value applied to the data pad DQ. In this case, the pull-down tuning circuit PC2 may tune the pull-down resistance value. During the second termination mode, the pull-down tuning circuit PC2 may reflect an additional resistance value different from the default value in the pull-down resistance value.

The first pull-up driver D1 and the plurality of second pull-up drivers D2 included in the pull-up driving circuit DC1 and the first pull-down driver D3 and the plurality of second pull-down drivers D4 included in the pull-down driving circuit DC2 may be controlled as shown in Table 2 below. For convenience in description, Table 2 representatively represents one trimming code signal PU_TRIM<K> among the plurality of first trimming code signals PU_TRIM<1:N>, one trimming code signal PD_TRIM<K> among the plurality of second trimming code signals PD_TRIM<1:N>, one pull-up driver D2_K corresponding to one trimming code signal PU_TRIM<K> among the plurality of second pull-up drivers D2, and one pull-down driver D4_K corresponding to one trimming code signal PD_TRIM<K> among the plurality of second pull-down drivers D4.

TABLE 2

| | 1$^{ST}$ TERMINATION MODE | | | | 2$^{ND}$ TERMINATION MODE | | | |
|---|---|---|---|---|---|---|---|---|
| CTT_EN | 1 | 1 | 1 | 1 | 0 | 0 | 0 | 0 |
| DIN | 1 | 1 | 0 | 0 | 1 | 1 | 0 | 0 |
| PU_TRIM<K> | 1 | 0 | 1 | 0 | 1 | 0 | 1 | 0 |
| PD_TRIM<K> | 1 | 0 | 1 | 0 | 1 | 0 | 1 | 0 |
| D1 | ON | ON | OFF | OFF | OFF | OFF | OFF | OFF |
| D2_K | ON | OFF | OFF | OFF | ON | OFF | OFF | OFF |
| D3 | OFF | OFF | ON | ON | OFF | OFF | ON | ON |
| D4_K | OFF | OFF | ON | OFF | OFF | OFF | ON | OFF |
| DOUT (@ DQ) | 1 | 1 | 0 | 0 | 1 | 1 | 0 | 0 |

Figure 4:
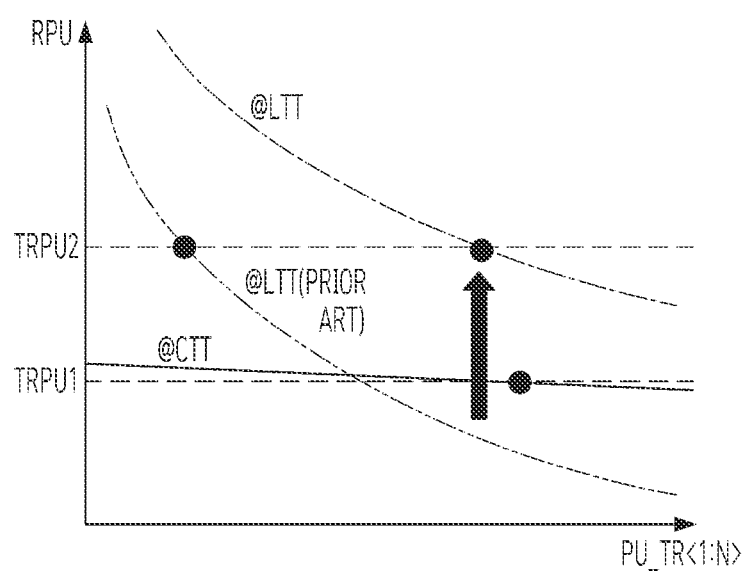
FIG. 4 is a graph illustrating a pull-up resistance value.

FIG. 4 is a graph illustrating the pull-up resistance value (herein marked with reference symbol "RPU").

Referring to FIG. 4, during the first termination mode, the pull-up driving circuit DC1 may adjust the pull-up resistance value RPU so that the pull-up resistance value RPU corresponds to a target resistance value TRPU1. When the pull-up resistance value RPU satisfies the target resistance value TRPU1, that is, when the pull-up resistance value RPU and the target resistance value TRPU1 coincide, the amount of change in the pull-up resistance value RPU according to the amount of change in the second pull-up control signals PU_TR<1:N>, that is, the amount of change per one step or one code, is relatively small, that is, the slope of a solid line is relatively gentle, and therefore, the pull-up tuning circuit PC1 may maintain the default value reflected in the pull-up resistance value RPU, and may not perform additional tuning on the pull-up resistance value RPU.

During the second termination mode, the pull-up driving circuit DC1 may adjust the pull-up resistance value RPU so that the pull-up resistance value RPU corresponds to a target resistance value TRPU2. According to the prior art, during the second termination mode, when the pull-up resistance value RPU satisfies the target resistance value TRPU2, that is, when the pull-up resistance value RPU and the target resistance value TRPU2 coincide, the amount of change in the pull-up resistance value RPU according to the amount of change in the second pull-up control signals PU_TR<1:N>, that is, the amount of change per one step, may be relatively large, that is, the slope of a two-dot chain line may be relatively steep. This is because the amount of current flowing through the pull-up driving circuit DC1 per one step in the second termination mode increases compared to the amount of current flowing through the pull-up driving circuit DC1 per one step in the first termination mode. Accordingly, according to the present embodiment, during the second termination mode, the pull-up tuning circuit PC1 may reflect an additional resistance value different from the default value in the pull-up resistance value RPU. According to the present embodiment, during the second termination mode, when the pull-up resistance value RPU satisfies the target resistance value TRPU2, the pull-up resistance value RPU may be tuned so that the amount of change in the pull-up resistance value RPU according to the amount of change in the second pull-up control signals PU_TR<1:N>, that is, the amount of change per one step, becomes relatively small, that is, the slope of a one-dot chain line becomes relatively gentle.

Figure 5:
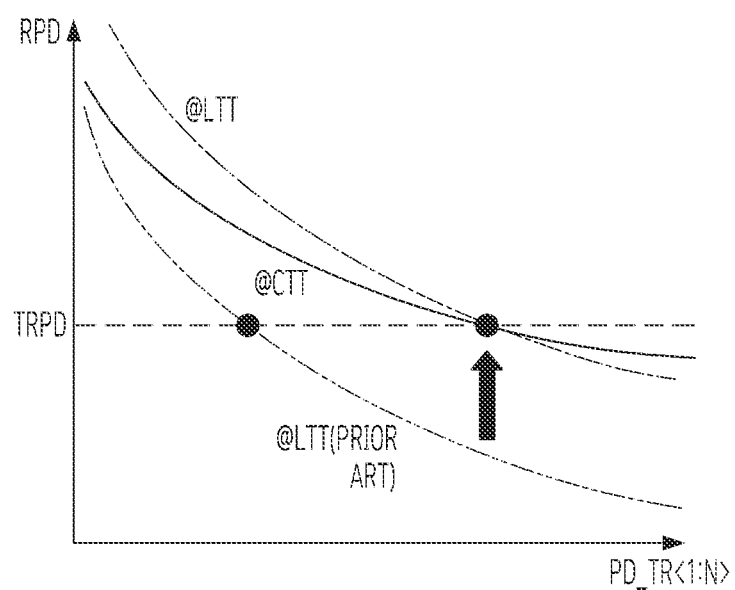
FIG. 5 is a graph illustrating a pull-down resistance value.

FIG. 5 is a graph illustrating the pull-down resistance value (herein marked with reference symbol "RPD").

Referring to FIG. 5, during the first termination mode, the pull-up driving circuit DC2 may adjust the pull-down resistance value RPD so that the pull-down resistance value RPD corresponds to a target resistance value TRPD. When the pull-down resistance value RPD satisfies the target resistance value TRPD, the amount of change in the pull-up resistance value RPU according to the amount of change in the second pull-down control signals PD_TR<1:N>, that is, the amount of change per one step, is relatively small, that is, the slope of a solid line is relatively gentle, and therefore, the pull-down tuning circuit PC2 may maintain the default value reflected in the pull-down resistance value RPD, and may not perform additional tuning on the pull-down resistance value RPD.

During the second termination mode, the pull-down driving circuit DC2 may adjust the pull-down resistance value RPD so that the pull-down resistance value RPD corresponds to the target resistance value TRPD. According to the prior art, during the second termination mode, when the pull-down resistance value RPD satisfies the target resistance value TRPD, that is, when the pull-down resistance value RPD and the target resistance value TRPD coincide, the amount of change in the pull-down resistance value RPD according to the amount of change in the second pull-down control signals PD_TR<1:N>, that is, the amount of change per one step, may be relatively large, that is, the slope of a two-dot chain line may be relatively steep. This is because the amount of current flowing through the pull-down driving circuit DC2 per one step in the second termination mode increases compared to the amount of current flowing through the pull-down driving circuit DC2 per one step in the first termination mode. Accordingly, according to the present embodiment, the pull-down tuning circuit PC2 may reflect an additional resistance value different from the default value in the pull-down resistance value RPD. For example, the additional resistance value may be smaller than the default value. According to the present embodiment, during the second termination mode, when the pull-down resistance value RPD satisfies the target resistance value TRPD, that is, when the pull-down resistance value RPD and the target resistance value TRPD coincide, the pull-down resistance value RPD may be tuned so that the amount of change in the pull-down resistance value RPD according to the amount of change in the second pull-down control signals PD_TR<1:N>, that is, the amount of change per one step, becomes relatively small, that is, the slope of a one-dot chain line becomes relatively gentle.

According to the present embodiment, a pull-up resistance value and a pull-down resistance value applied to a data pad may be optimally tuned according to a plurality of termination modes.

Figure 6:
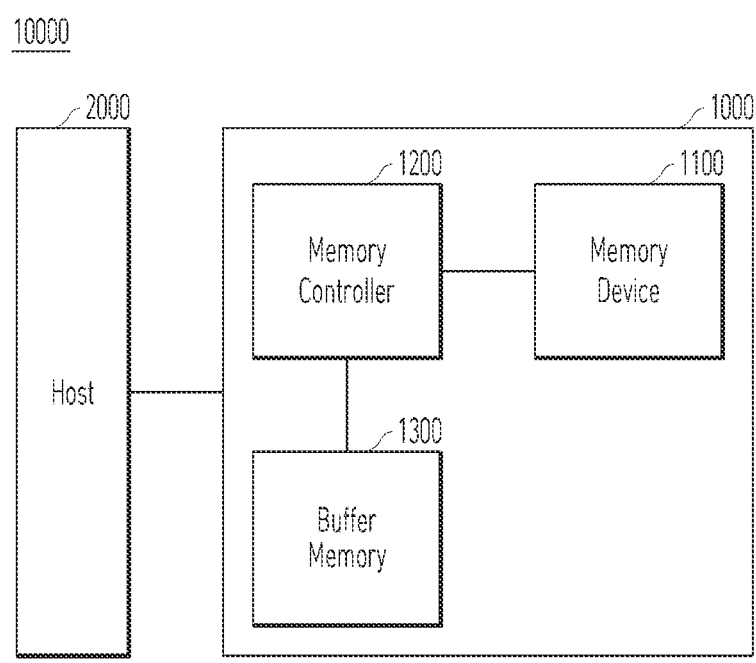
FIG. 6 is a block diagram illustrating a semiconductor system to which a semiconductor device is applied, in accordance with an embodiment of the present disclosure.

FIG. 6 is a block diagram illustrating a semiconductor system 10000 to which the semiconductor device 100 illustrated in FIG. 1 is applied.

Referring to FIG. 6, the memory system 10000 may include a memory system 1000 in which data is stored and a host 2000 that controls the memory system 1000. The memory system 1000 may include a memory device 1100 in which data is stored, a buffer memory 1300 for temporarily storing data required for operation of the memory system 1000, and a memory controller 1200 that controls the memory device 1100 and the buffer memory 1300 according to a request from the host 2000.

The host 2000 may communicate with the memory system 1000 by using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a non-volatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The memory device 1100 may be implemented as a volatile memory device in which data is lost when power supply is cut off, or as a non-volatile memory device in which data is retained even when the power supply is cut off. The memory device 1100 may perform a program operation (or write operation), a read operation, or an erase operation under the control of the memory controller 1200. For example, during the program operation, the memory device 1100 may receive commands, addresses, and data from the memory controller 1200, and perform the program operation. During the read operation, the memory device 1100 may receive commands and addresses from the memory controller 1200, and output read data to the memory controller 1200. To this end, the memory device 1100 may include an interface circuit for inputting and outputting data. The memory device 1100 may correspond to the semiconductor device 100 illustrated in FIG. 1.

The memory controller 1200 may generally control the operation of the memory system 1000, and control data exchange between the host 2000 and the memory device 1100. For example, the memory controller 1200 may control the memory device 1100 to program, read, or erase data according to a request from the host 2000. In addition, the memory controller 1200 may receive data and a logical address from the host 2000 and convert the logical address into a physical address that indicates a region where the data is to be actually stored in the memory device 1100. Moreover, the memory controller 1200 may store a logical-to-physical address mapping table, which constitutes a mapping relationship between the logical address and the physical address, in the buffer memory 1300.

The buffer memory 1300 may be used as an operation memory or cache memory of the memory controller 1200, and store system data used in the memory system 1000 other than the above-described information. According to an embodiment, the buffer memory 1300 may include a double data rate synchronous dynamic random access memory (DDR SDRAM), a DDR4 SDRAM, a low power double data rate fourth generation (LPDDR4) SDRAM, a graphics double data rate (GDDR) SDRAM, a low power DDR (LPDDR), or a Rambus dynamic random access memory (RDRAM)

According to an embodiment of the present disclosure, a pull-up resistance value and a pull-down resistance value applied to a data pad may be optimally tuned according to a plurality of termination modes, which makes it possible to minimize current consumption.

According to an embodiment of the present disclosure, circuits for optimally adjusting the pull-up resistance value and the pull-down resistance value may be designed not to be directly connected to the data pad, and thus capacitance of the data pad may not be further increased by the above circuits.

According to an embodiment of the present disclosure, the circuits may be designed with only simple logic circuits and active elements, which makes it possible to minimize an added area.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An interface circuit comprising:
a data pad;
a first driving circuit connected between the data pad and a first supply node, and configured to adjust a first resistance value applied between the data pad and the first supply node according to termination modes and selectively drive the data pad with a first supply voltage; and
a first tuning circuit connected between the first supply node and a first voltage supply terminal, and configured to tune the first resistance value according to the termination modes.

2. The interface circuit of claim 1, wherein the first driving circuit includes:
a first driver configured to be independently controlled according to one of the termination modes; and
a plurality of second drivers configured to be controlled in common according to the termination modes.

3. The interface circuit of claim 1, wherein the first tuning circuit includes a plurality of third drivers connected in parallel between the first voltage supply terminal and the first supply node, and configured to selectively operate according to the termination modes based on a plurality of first control signals.

4. The interface circuit of claim 1, wherein the first tuning circuit is configured to electrically disconnect the first voltage supply terminal from the first supply node during a power-down mode.

5. The interface circuit of claim 1, further comprising:
a second driving circuit connected between the data pad and a second supply node, and configured to adjust a second resistance value applied between the data pad and the second supply node according to the termination modes and selectively drive the data pad with a second supply voltage; and
a second tuning circuit connected between the second supply node and a second voltage supply terminal, and configured to tune the second resistance value according to the termination modes.

6. The interface circuit of claim 5, wherein the second driving circuit includes:
a fourth driver independently controlled according to one of the termination modes; and
a plurality of fifth drivers controlled in common according to the termination modes.

7. The interface circuit of claim 5, wherein the second tuning circuit includes a plurality of sixth drivers connected in parallel between the second supply node and the second voltage supply terminal, and configured to selectively operate according to the termination modes based on a plurality of second control signals.

8. The interface circuit of claim 5, wherein the second tuning circuit is configured to electrically disconnect, during a power-down mode, the second supply node from the second voltage supply terminal.

9. An interface circuit comprising:
a data pad;
an output circuit connected to the data pad, and configured to adjust a pull-up resistance value and a pull-down resistance value applied to the data pad according to termination modes, and output, through the data pad, output data which corresponds to a selected mode among the termination modes; and
a tuning circuit connected to the output circuit, and configured to tune the pull-up resistance value and the pull-down resistance value according to the termination modes.

10. The interface circuit of claim 9, wherein the output circuit includes:
a pull-up driving circuit connected between the data pad and a first supply node, and configured to adjust the pull-up resistance value according to the selected mode, and pull-up drive the data pad with a first supply voltage based on a first pull-up control signal and second pull-up control signals; and
a pull-down driving circuit connected between the data pad and a second supply node, and configured to adjust the pull-down resistance value according to the selected mode, and pull-down drive the data pad with a second supply voltage based on a first pull-down control signal and second pull-down control signals.

11. The interface circuit of claim 10, wherein the pull-up driving circuit includes:
a first pull-up driver configured to be independently controlled in a predetermined mode of the termination modes based on the first pull-up control signal; and
a plurality of second pull-up drivers configured to be controlled in common in the termination modes based on the second pull-up control signals.

12. The interface circuit of claim 10, wherein the pull-down driving circuit includes:
a first pull-down driver configured to be independently controlled in a predetermined mode of the termination modes based on the first pull-down control signal; and
a plurality of second pull-down drivers configured to be controlled in common in the termination modes based on the second pull-down control signals.

13. The interface circuit of claim 9, wherein the tuning circuit includes:
a pull-up tuning circuit connected between a first supply node, which is connected to the output circuit, and a high voltage supply terminal, and configured to tune the pull-up resistance value according to the termination modes; and a pull-down tuning circuit connected between a second supply node, which is connected to the output circuit, and a low voltage supply terminal, and configured to tune the pull-down resistance value according to the termination modes.

14. The interface circuit of claim 13, wherein the pull-up tuning circuit includes a plurality of third pull-up drivers connected in parallel between the high voltage supply terminal and the first supply node, and configured to selectively operate according to the termination modes based on a plurality of third pull-up control signals.

15. The interface circuit of claim 13, wherein the pull-up tuning circuit is configured to electrically disconnect, during a power-down mode, the high voltage supply terminal from the first supply node.

16. The interface circuit of claim 13, wherein the pull-down tuning circuit includes a plurality of third pull-down drivers connected in parallel between the second supply node and the low voltage supply terminal, and configured to selectively operate according to the termination modes based on a plurality of third pull-down control signals.

17. The interface circuit of claim 13, wherein the pull-down tuning circuit is configured to electrically disconnect, during a power-down mode, the second supply node from the low voltage supply terminal.

18. A semiconductor device comprising:
a data pad; and
an interface circuit configured to:
adjust at least one of a pull-up resistance value and a pull-down resistance value applied to the data pad according to the termination modes;
selectively tune the at least one of the pull-up resistance value and the pull-down resistance value according to a selected mode among the termination modes; and
interface, through the data pad, data.

19. The semiconductor device of claim 18, further comprising:
a control circuit configured to generate first to third pull-up control signals and first to third pull-down control signals, which correspond to termination modes and a power-down mode, based on data, first and second mode signals, a plurality of first and second trimming code signals, and a power gating signal,
wherein the interface circuit adjusts the at least one of the pull-up resistance value and the pull-down resistance value based on the first and second pull-up control signals and the first and second pull-down control signals, and
wherein the interface circuit selectively tune the at least one of the pull-up resistance value and the pull-down resistance value based on the third pull-up control signals and the plurality of third pull-down control signals.

20. The semiconductor device of claim 19, wherein the control circuit includes:
a first control logic circuit configured to generate the first pull-up control signal based on the data and the first mode signal;
a second control logic circuit configured to generate the second pull-up control signals based on the data and the plurality of first trimming code signals;
a third control logic circuit configured to generate the first pull-down control signal based on the data and the plurality of second trimming code signals;
a fourth control logic circuit configured to generate the second pull-down control signals based on the data and the plurality of second trimming code signals; and
a fifth control logic circuit configured to generate the plurality of third pull-up control signals and the plurality of third pull-down control signals based on the first and second mode signals and the power gating signal.

* * * * *